United States Patent
Kane et al.

(10) Patent No.: US 7,509,536 B1
(45) Date of Patent: *Mar. 24, 2009

(54) METHOD AND SYSTEM FOR ERROR HANDLING

(75) Inventors: Brian Kane, Feeding Hills, MA (US); Sandra Stratton, Vernon, CT (US); Nancy Benigni, Manchester, CT (US)

(73) Assignee: Travelers Property Casualty Corp., Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/434,727

(22) Filed: May 16, 2006

Related U.S. Application Data

(63) Continuation of application No. 10/202,864, filed on Jul. 26, 2002, now Pat. No. 7,137,043.

(60) Provisional application No. 60/307,882, filed on Jul. 27, 2001.

(51) Int. Cl.
*G06F 11/00* (2006.01)

(52) U.S. Cl. .......................................... 714/46; 714/47

(58) Field of Classification Search .................. 714/46, 714/47; 705/4; 715/709, 714, 715
See application file for complete search history.

(56) References Cited

U.S. PATENT DOCUMENTS

| | | | | |
|---|---|---|---|---|
| 5,210,869 A | * | 5/1993 | Williams | 714/48 |
| 5,557,736 A | * | 9/1996 | Hirosawa et al. | 714/4 |
| 5,758,065 A | * | 5/1998 | Reams et al. | 714/48 |
| 5,790,779 A | * | 8/1998 | Ben-Natan et al. | 714/39 |
| 5,819,028 A | * | 10/1998 | Manghirmalani et al. | 714/57 |
| 6,003,067 A | * | 12/1999 | Suzuki et al. | 709/204 |
| 6,006,016 A | * | 12/1999 | Faigon et al. | 717/48 |
| 6,363,503 B1 | * | 3/2002 | Clauss et al. | 714/57 |
| 6,392,709 B1 | * | 5/2002 | Orito | 348/569 |
| 6,526,524 B1 | * | 2/2003 | Kelley | 714/38 |
| 6,799,286 B1 | * | 9/2004 | Evans et al. | 714/57 |
| 2002/0007295 A1 | * | 1/2002 | Kenny et al. | 705/7 |
| 2002/0144192 A1 | * | 10/2002 | Owari | 714/46 |
| 2005/0033466 A1 | * | 2/2005 | Eryurek et al. | 700/108 |
| 2005/0088690 A1 | * | 4/2005 | Haneda et al. | 358/1.15 |

* cited by examiner

*Primary Examiner*—Bryce P Bonzo
(74) *Attorney, Agent, or Firm*—Irah H. Donner; Wilmer Cutler Pickering Hale and Dorr LLP

(57) ABSTRACT

A method and system for error handling by incorporating functionality to identify errors at two levels of context. A first level providing the user with an error message, and the second level identifying where in the process the error occurred. The method and system comprise a reusable piece of code and building blocks providing universal use of a variety of applications that captures errors at different levels of context. Additionally, the method and system takes the building blocks and pushes the functionality out to the Internet.

34 Claims, 4 Drawing Sheets

METHOD AND SYSTEM FOR ERROR HANDLING

CROSS-REFERENCE TO RELATED APPLICATIONS

This application is a continuation of U.S. patent application Ser. No. 10/202,864, filed Jul. 26, 2002 and claims priority to, and herein incorporates by reference in its entirety, U.S. Provisional Application Ser. No. 60/307,882 filed Jul. 27, 2001.

FIELD OF THE INVENTION

The present invention relates to a method and system for error handling. More particularly, but not by way of limitation, the invention relates to a method and system for capturing errors at different levels of context, enabling universal use in a variety of applications via the Internet, and facilitating the implementation of the error handling process.

BACKGROUND OF THE INVENTION

Current error handling processes and systems do not foster a shared environment involving multiple functionalities. They generally exist for particular applications and cannot be utilized by multiple applications across business lines that are necessary to carry out the many activities within an organization. Additionally, the functionality of current error handling processes exists generally in mainframe systems and are not available via the Internet. Further, these systems handle errors at only one level of context.

For example, within business organizations, programming is often occurring in a componentized manner where there are different business units across an organization that are responsible for programming certain functionalities. These functionalities are required to be shared among the different units, so there is a need to move from one component to another component to conduct many of the automated business tasks.

In the framework of the insurance business, components involving software code and associated data, are developed, for example, for creating an insurance policy and for administering an accounting system. A customer may access the insurance company's website in an effort to add a new policy. The task of adding a new policy may also involve invoking or "calling" the accounting component, where the customer's existing account information is maintained.

In this process, if the customer or an insurance agent, for example, incorrectly enters data or if there is a problem associated with either the accounting or "Add Policy" software, an error message may appear that states, for example, "Your attempt to add a policy failed." This is only one level of context. It identifies that the customer failed to add a policy but does not further explain whether the failure was a result of a problem with the account processing or incorrectly entered data. A message identifying an account processing failure or incorrectly entered data would be the second level of context and describes, for example, where the failure occurred.

Alternatively, if only the more detailed level of context is returned, without also providing a higher level of context, confusion may result, especially when a user is not aware of underlying processes that may have been invoked and are at the root of the problem. In the simple example provided above concerning the "Add Policy" scenario, there may not be much confusion with the lower level context, but when a structure of components calling several other components is implemented on a large scale, a failure may occur in a place the user was not even aware programming was being executed, and the more detailed context may not effectively communicate that the requested task was never performed due to an error.

Accordingly, there is a need for a standardized method and system for capturing errors at different levels of context across shared functionalities, that is simple to implement, and enables universal use of a variety of applications via a network.

SUMMARY OF THE INVENTION

The present invention overcomes the above-noted and other shortcomings by providing a novel and improved method and system that meets the aforementioned needs.

An embodiment of the inventive method involves breaking down the different business processes into components, that is, small pieces of functionality, and providing a generic error handling component so that it may be used in a number of different areas across a business enterprise.

In one embodiment, there are two pieces of functionality. The first functionality is displaying the error message to a user. The second functionality is having data available to the programming staff for determining where the error happened and providing a means for correcting the error.

An embodiment of the inventive method and system further comprises a reusable piece of code and building blocks that provide universal use of a variety of applications that captures errors at different levels of context. Additionally, the method and system takes these building blocks and pushes some of the functionality out to the Internet and/or other communication networks.

Another embodiment of the present invention is a method for handling errors via a communications network, comprising the steps of employing a common error handling component among at least two business process components. The method further involves presenting a user with at least one data field for entry of data via the communications network to perform a task, wherein the task involves invoking at least one of the business process components; receiving an input from the user in the data field; identifying the input as resulting in an error; presenting the user a message with text indicating the error, and wherein the message states the error in a first context and in at least a second context.

Further embodiments include the business process components having shared functionalities, and the two business process components comprising a first process component of a first business unit and a second process component of a second business unit, both first and second units belonging to a single organization. Further, the first context of the error message identifies the task that could not be performed and the second context identifies the data field that contained the error or, alternatively, identifies the software having the error that prevented the performance of the task.

Additional embodiments include storing information regarding the error in an error database for later analysis; identifying common errors; reviewing the common errors to determine if a software problem is the reason for the errors; and reviewing the language of the text in the error message when at least a second error is made in the data field by the user attempting to repeat the task.

Another embodiment involves identifying a calling chain through the business process components; identifying a source for the error in the calling chain; highlighting the data field where the error occurred; providing application developers a website, wherein the developers may modify the error message; and determining an amount of error information to be provided to the user; and wherein information regarding the error moves through the two business process components and wherein the two business processes involve providing insurance coverage.

Another embodiment of the present invention is a system for handling errors via a communications network comprising a common error handling component employed among at least two business process components; a graphical interface for presenting a user with at least one data field for entry of data via the communications network to perform a task, wherein the task involves invoking at least one of the two business process components; a receiving device for receiving an input from the user at the data field; a processor for identifying the input as resulting in an error; and a transmitting device for presenting the user a message with text indicating the error, wherein the message states the error in a first context and in a second context.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

An embodiment of the present method and system provides error messages back to the user not only as a general statement that an error has occurred, but also as a message specifically identifying where the error occurred. For example, the system sends a user a detailed, lower level message stating, "You sent ten pieces of information and out of the ten, these two are incorrect." Another example of a lower level message would be, "Your requested transaction failed because account number 12345 did not exist." In this instance, the account number was entered by the user and found not to exist at the second level of context. The invention includes these substitution parameters, where data is substituted into the message in runtime, thereby providing users more detail when the message is presented to the user.

Figure 1:
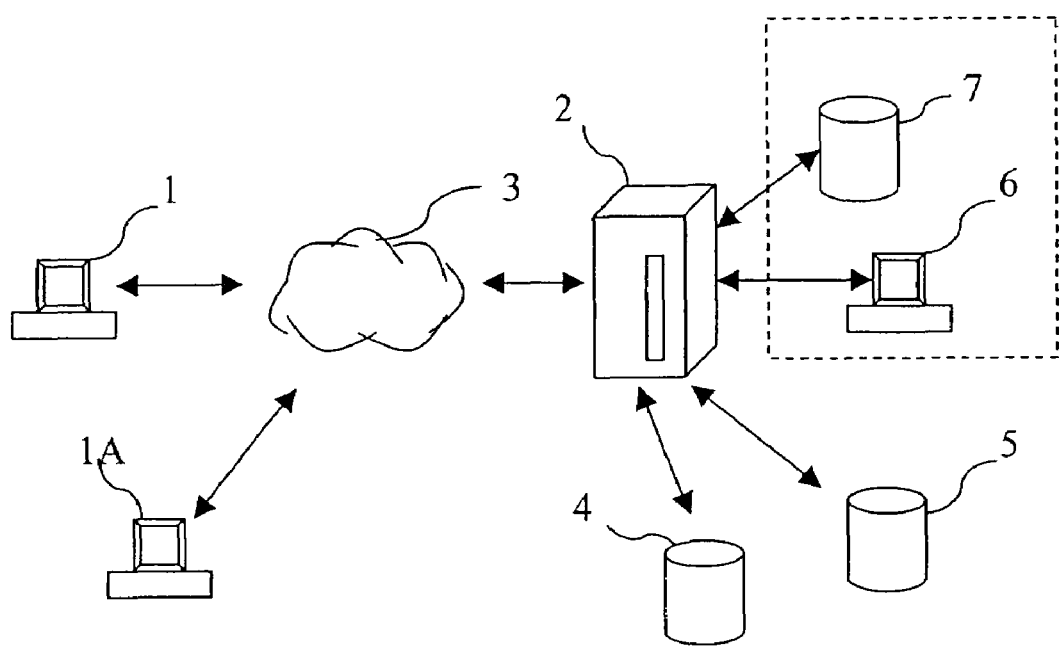
FIG. 1 illustrates a system architecture of an embodiment of the present invention.

FIG. 1 depicts an embodiment that shows the invention being used in the context of accessing information regarding an insurance policy, particularly, a user 1 or an insurance agent 1A accessing databases 2 via the Internet 3 in order to add an additional insurance policy to supplement existing coverage. Although specific types of insurance coverage vary (auto, home, etc.), because this application is implemented in a consistent manner across business lines, the error handling component and database can be shared across divisions or units and more importantly foster the reuse of business components 4, 5 across those divisions. For example, components 4 built or utilized in one division, such as Commercial Lines insurance can share with components 5 developed for Personal Lines insurance more easily because a consistent error handling process assures both divisions have standardized their interfaces with respect to passing error information back to the user.

Further, these components 4,5 may be third party components or legacy components. The present invention does not preclude, for example, calling a 20 year old legacy component, with its existing error processes, and passing error messages through newer and distinct components.

The inventive method and system not only gives the end user more information about what kind of error has been encountered, it also assists the programming staff 6 in better understanding the error. For example, the programming staff is now able to identify exactly which piece of the programming is associated with the error.

In further embodiments of the present invention, a separate error database 7 is provided that stores error information to enable backend analysis to determine, for example, if there is something wrong with the software or text description in the error messages.

Figure 2:
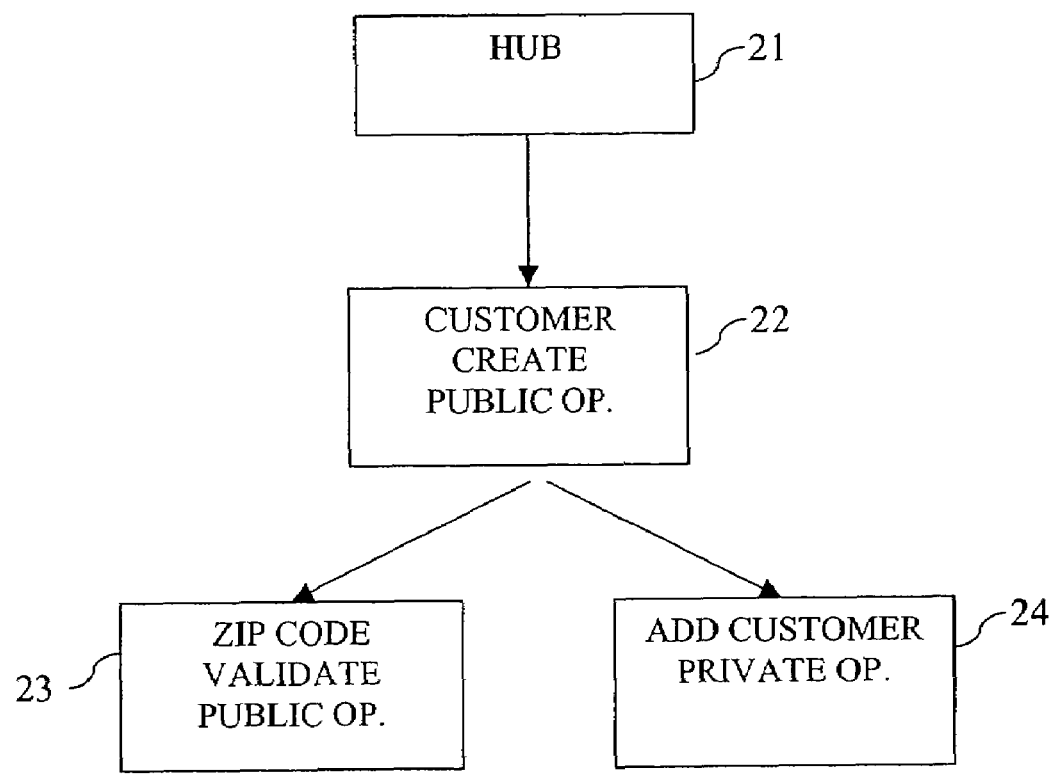
FIG. 2 illustrates an embodiment for capturing the context of an error at two levels.

FIG. 2 illustrates an embodiment of the inventive method and system. In this particularized scenario involving an insurance application, capturing the context of an error includes the following two levels: 1) In terms of the Public Operation and the Hub Calls, and 2) In terms of where the error actually occurred. In FIG. 2, a hub 21 is created that calls the Public Operation to Customer Create. The Customer Create Public Operation 22 may call many Public and Private Operations to handle this task. In this case one public operation, Zip Code Validate 23, and one private operation, Add Customer 24, are needed to complete the Customer Create Public Operation.

In this example the Hub 21 is inquiring as to the outcome of the Customer Create Public Operation 22. This is considered to be in the Customer Add context. If the error that occurred was due to the Zip Code Validation failing in the Zip Code Validate Public Operation 23, this is additional information that is captured to best explain where an error occurred. This level of information is considered to be in the Zip Code Validate context. An example of an error message that captures the error in both contexts is, "Customer Create Failed. Zip Code entered is invalid."

Referring again to FIG. 2, the Hub 21 is the physical and logical representation of when, for example, the "Enter" button is clicked on the web page. The Hub 21 is a transaction that needs to be executed. The Hub 21, for example, represents a user at a web browser who has entered all of the customer information, for example, name, address, social security number. The user enters the data and it travels through the Internet and ending up at the mainframe as shown in FIG. 1.

Figure 3:
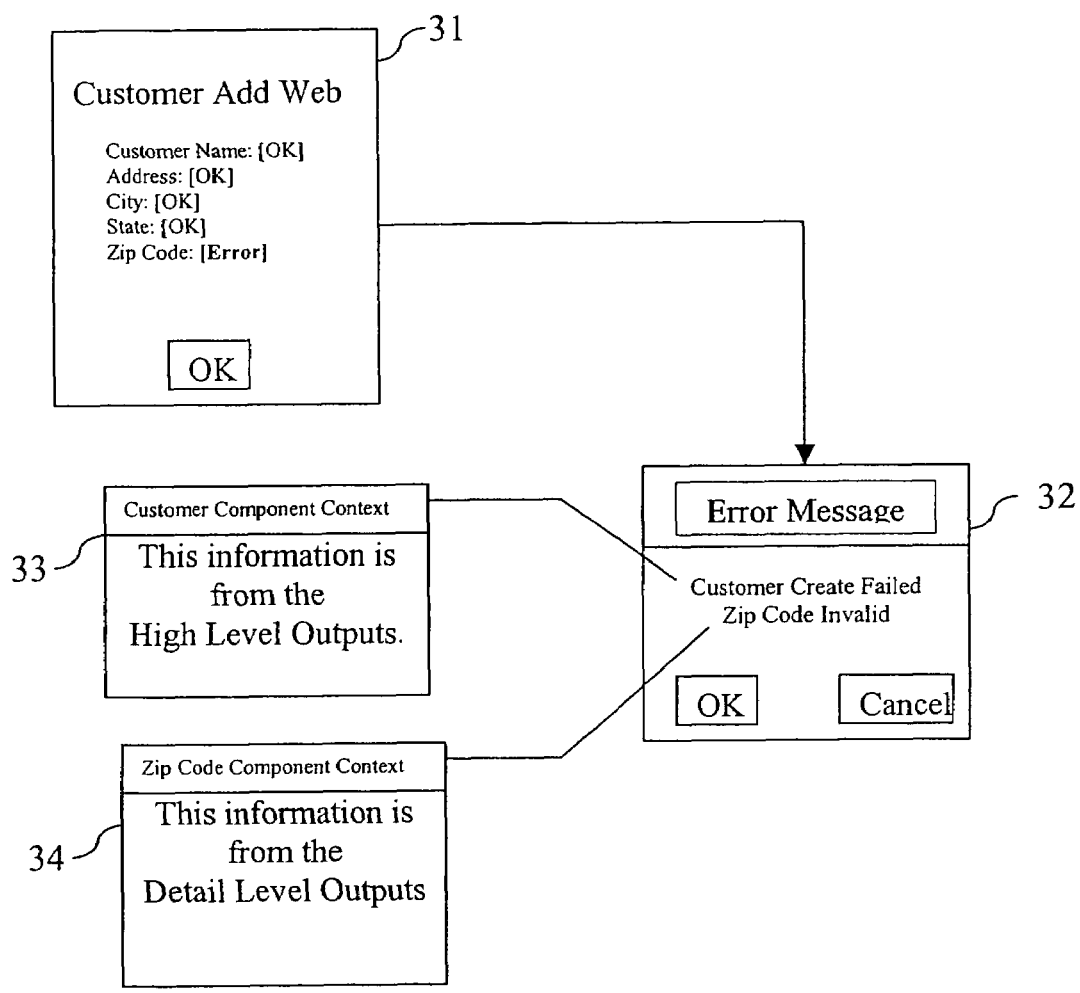
FIG. 3 illustrates an embodiment for an error message.

FIG. 3 illustrates an error handling example. The Customer Add web page 31 shows that information was correctly entered regarding the customer name, address, city, and state. However, the zip code was incorrect. In this case, before a policy can be added, the zip code is checked to see if it is valid for the city and state entered.

An Error Message Box 32 results wherein "Customer Create Failed" and "Zip Code Invalid" are displayed. The Customer Component Context 33 is information from the High Level Outputs (or first level) and the Zip Code Component Context 34 is from the Detail Level Output (or low level).

In another related scenario, the user selects "OK" on an "Add Policy" screen, and attempts to add a policy but fails to provide a policy number. The inventive method and system sends a message back stating, for example, "Error—Please provide a policy number." In selecting "OK," without entering the necessary or appropriate data, the system causes the "Add Policy" component to call, for example, the "Check if I have an account" component, which may call another component, which calls another component, and so on.

The inventive method and system provides a further level of detail, or context, in that it not only indicates whether the user failed in adding the policy, but also, indicates the source of the failure and the reason for the failure to a user and a programmer. For example, the user will get an error message with the first part stating, "Add policy failed" and a second part stating, "Account does not exist." There is a record in the database for "Add a policy failed," and there is another record for "Account does not exist." An embodiment of the method and system then implements calls to the database, pulling the records, and then sending them back to the user combined together as a readable error message—"Add Policy failed. Account does not exist".

Additionally, the error handling method and system takes the building blocks and pushes some of the functionality out to the Internet. Therefore, a user at home is able to utilize a browser to access the data of the present system. A further embodiment of the present invention allows application developers to access the error handling message database as a website and gives the developers the ability to add or modify error messages they wish to display to their end users. The messages the developers add/modify through this application may involve both levels of context.

Figure 4:
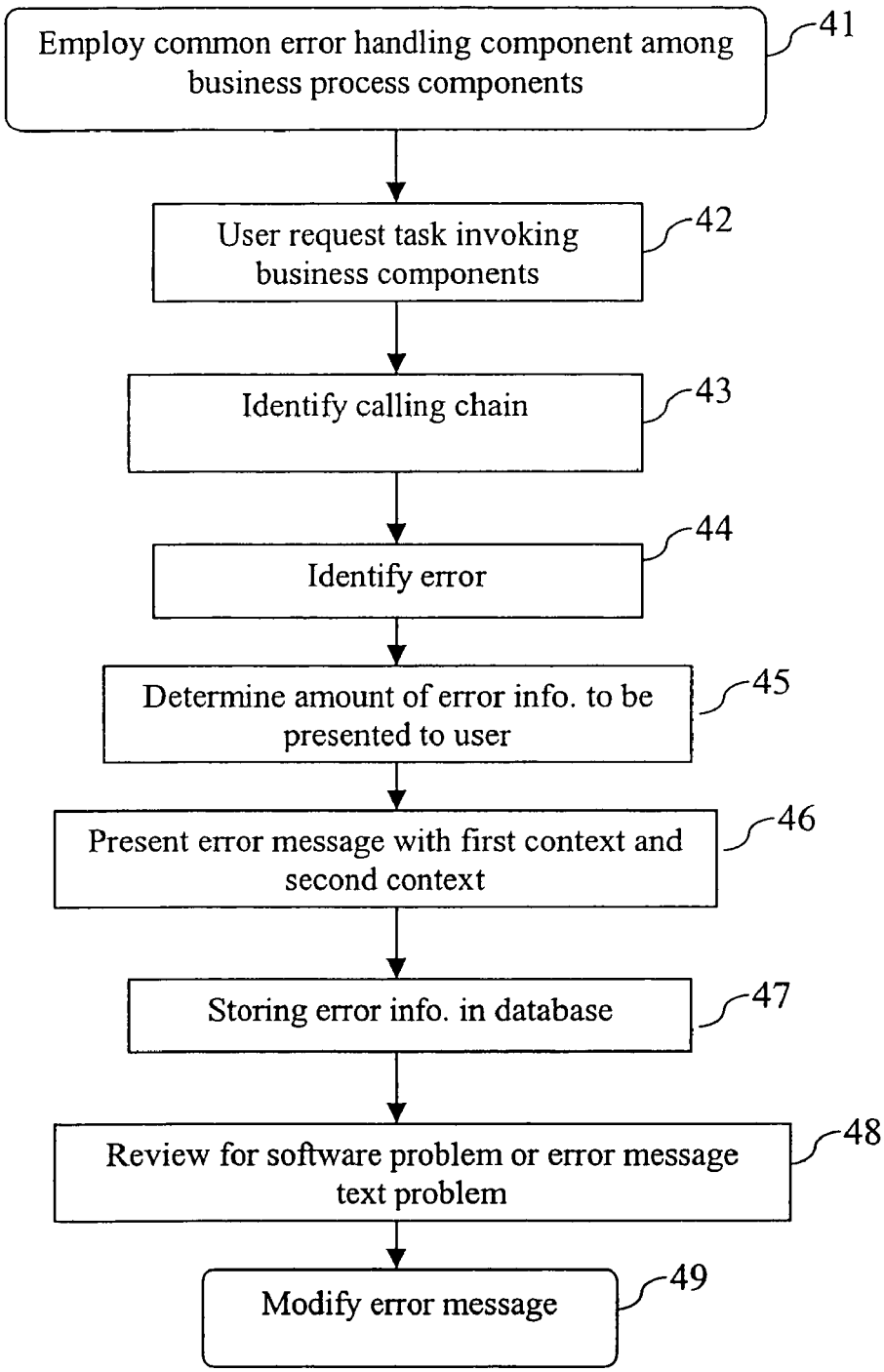
FIG. 4 illustrates a methodology of an embodiment of the present invention.

FIG. 4 illustrates a methodology for an embodiment of the present invention. FIG. 4 shows employing a common error handling component among at least two business process components 41 and presenting a user with at least one data field for entry of data via a communications network to perform a task, wherein the task involves invoking at least one business process component 42. The methodology further includes identifying the calling chain 43 and the error 44 and determining the amount of information to be presented to the user 45. The method further includes presenting the user a message with text indicating the error, and wherein the message states the error in a first context and/or in at least a second context 46.

Additional embodiments include storing information regarding the error in an error database 47 for later analysis and reviewing the errors to determine if a software problem is the reason for the errors and/or if there is a problem with the text in the error message 48 such that the text needs to be modified 49.

A further embodiment of the method and system involves programming that runs on, for example, a Multiple Virtual Storage operating system (MVS) system, IBM's Customer Information Control System (CICS) and Information Management System (IMS) online transaction processing software. The method and system incorporate coding wherein the reusable components capture the error at the lowest level and follow it through the upper levels in order to get the various levels of context. When the error gets to the very top, that is, where it actually happens or where the error entered the system, then calls are made to a database comprising all of the error messages.

Through the invention, by building components, a structure is developed where it may take, as an example, six individual programs that perform their own functions to make up a component or operation. At each level of the six programs, the error handling code is pushed into the operations. Therefore, when an error occurs, it will be identified and passed back up to the particular program that alerted to the error. A further embodiment of the invention utilizes substitute values so that the data the user passed can be captured, and a personalized message is generated on the screen to effectively describe the error.

In a further embodiment, with the coding attached to a particular message, when the error is encountered at runtime, it will go out to the database, pull that message off, and present the message to the user. Calls to this component are programmed into the system and the graphical user interface is utilized to put the desired data that will be presented to the user onto the database so it can be retrieved.

The inventive method and system is not tied to any particular type of business or application. It could be set aside on its own and used in a component framework. For example, the application could be the selling of automotive parts, or not even a sales-type application.

Further, the term caller, used herein, is not intended to be limiting. It can refer to a customer or insurance agent at a computing device accessing a website, or the programmer or developer that is actually making a call to the program to complete a task.

Regarding the capturing of error, the error can be bubbled up to a point where it can be returned to the user, not overlaid. For example, in the "Add Policy" scenario, the error message can be passing from the policy component to the place where the zip code service lives. It can be passing through, for example, ten different components. The present invention allows moving the error message up the stack, such that it can make its way up to the top and is not overlaid.

Therefore, the message could be produced all the way back to the agent sitting at a computer, accessing a website; or it can be sent to the programmer who is accepting the message before it gets sent back to the user. The programmer may look at the error that occurred and perform some process. Or, it might be something the programmer can automate in the middle and perform the automation and keep the error message going down the path.

One meaning of "component" as used herein is the code and the associated data all encapsulated together. For example, the policy component will be the programming, as well as, the data that makes up what is considered a policy.

The present method standardizes how the different groups at an organization are writing components. The present method involves standardizing how common errors are bubbled up the stack. For example, if programmers are in the Policy Group writing component No. 1, and a call is received from a component of another group, component No. 2, they can be assured that the way the error handling data is going to get back to them is going to be consistent, whether they call component No. 2 or some other group, component No. 3.

Benefits of the present invention not only involve a message that is shown to the user, but the benefits also include how the mainframe applications and middle tier applications compose the error and store the data regarding where the error happened so that not only can the user be informed where the error occurred at both levels of context but, in the case where there is a programming problem, the developer has an idea of how to track down the problem.

In other embodiments, information on the error is stored in a database different from the database from which the error messages are pulled. This database is one where data may be tracked.

A further embodiment of the present invention also permits a programmer to go into the database and find the error that occurred and have it tell the programmer exactly what program was the source of the problem. This feature is available because error data has not only been captured, but is also made to reveal, for example, that the source of the error is in program XYZ which is part of component ABC.

As previously noted, an aspect of the present invention also involves presenting the developer the necessary information for debugging a problem and understanding the calling chain, or stack, the programming traveled when it encountered the error. For example, a calling chain results if component A needs to call components B, C, and D in order to accomplish a task. The present invention enables the developer to query a database in order to determine in which component and in which program the error occurred. An example of these components are the different business functionalities, such that, one component may involve centralized look-up information, another component may involve account information, another component may involve policy information, etc. Some of the components are also stand alone components.

An example of a development environment for the present invention is Cool:Gen that can be used to build components that run at the mainframe. It is basically a code generator that generates runtime code and is where the components are built. The error handling components of the present invention in, for example, the Cool:Gen environment are put out in a central place so that every developer, when they are developing components, know which of the error handling programs they are to be using based on what level they are building in the call chain.

An embodiment of the error handling architecture comprises of five parts: 1)

An Error Definition Facility which is the application to define errors to the database; 2) Component Registration Facility which is the application to track and register the unique components at a business, such as, Travelers; 3) Context String Build Public Operation which is a consumable public operation that is provided to developers to pass error information through the coding structure; 4) Error Retrieval Public Operation which is a consumable public operation that is provided to developers to retrieve error messages from the database; and 5) Documentation of, for example, Cool:Gen coding techniques to implement error handling.

As noted, an embodiment of the present invention involves handling errors at two levels of context. In one embodiment, a definition of a unique error consists of a Return Code (5 bytes, numeric), a Reason Code (5 bytes, numeric) and an Origin Servid (15 bytes, numeric). Ways for handling an encountered error, in an embodiment of the present invention, includes: 1) Processing is OK—Continue processing; 2) Error Occurs—Handle it by Continuing to process; 3) Error Occurs—Stop Processing and Raise the Error; 4) Error Occurs—Do not know what happened, Raise the Error.

To handle the errors at two levels of context in accordance with an embodiment of the present invention, a mechanism is employed to handle the lower level error. This mechanism is the Context String. This Context String is built by passing the necessary information to the Context String Build Operation. An example of a Context String is:

111111111111111/−10/12345/ICS10011/DCS10251/S1/S2/S3/S4/S5/S6 where,
   111111111111111—is the Origin Servid
   −10—is the Return Code
   ICS10011—is the Public Operation ID
   DCS10251—is the Private Operation ID
   S1->S6-6 Optional Substitution Values 25 bytes each OR—
   100000000000001/−10/12345/IZZ10011/DZZ10251/Large Text message from legacy app where,
   100000000000001—is the Origin Servid that denotes this is
   a Legacy application Context String
   −10—is the Return Code
   12345—is the reason Code
   IZZ10011—is the Public Operation ID
   DZZ10251—is the Private Operation ID
   Large Text message from legacy app—is an optional large text message up to 150 bytes Error Handling Assumptions in an embodiment of the present invention include the following: 1) Origin Servids are assigned 1 per component and are unique across an organization, such as, Travelers; 2) The Origin Servid of 100000000000001 is reserved to denote the Context String being returned contains a Large Message Text attribute; 3) All Return Code/Reason Code/Origin Servid combinations are unique across the organization; 4) A Public Operation that returns an error condition (i.e., Return Code does not equal 1) must also return a fully populated Context String; 5) A Public Operation that ends successfully (i.e., Return Code equals 1) should never populate a Context String; and 6) The Context String cannot be used for any other purpose than error handling.

Embodiments of the present invention have now been described in fulfillment of the above objects. It will be appreciated that these examples are merely illustrative of the invention. Many variations and modifications will be apparent those skilled in the art.

We claim:

1. A method for handling errors via a communications network, comprising the steps of:
    employing a common error handling component among at least two business process components, wherein the error handling component is capable of receiving error information from said business process components in a common format;
    presenting a user with at least one data field for entry of data via the communications network to perform a task, wherein the task involves invoking at least one of the at least two business process components;
    receiving an input from the user in the at least one data field;
    identifying the input as resulting in an error; and
    presenting the user a message indicating the error, wherein the message states the error in a first context and in at least a second context.

2. The method of claim 1, wherein the at least two business process components have shared functionalities.

3. The method of claim 1, wherein the message identifies at least one of: a task that could not be performed, least one of the data fields that resulted in the error, and a process that prevented the performance of the task due to the error.

4. The method of claim 1, comprising storing the error information in an error database for later analysis.

5. The method of claim 4, comprising:
    analyzing the stored information to identify common errors; and
    reviewing the common errors to determine if a software problem is a reason for the common errors.

6. The method of claim 1, comprising
    passing the error information through a calling chain comprising the at least two business process components; and
    identifying a source for the error in the calling chain.

7. The method of claim 1, comprising highlighting the data field where the error occurred.

8. The method of claim 1, wherein the error information moves through the at least two business process components.

9. The method of claim 1, comprising:
    providing application developers a website, wherein the developers may modify the error message.

10. The method of claim 1, wherein the at least two business processes components include at least a first insurance coverage business process component and a second insurance coverage business process component.

11. The method of claim 1, comprising:
    determining an amount of error information to be provided to the user.

12. A system for handling errors via a communications network, comprising:
- a common error handling component employed among at least two business process components, wherein the error handling component is capable of receiving error information from said business process components in a common format;
- a graphical interface for presenting a user with at least one data field for entry of data via the communications network to perform a task, wherein the task involves invoking at least one of the at least two business process components;
- a receiving device for receiving an input from the user in the at least one data field;
- a processor for identifying the input as resulting in an error; and
- a transmitting device for presenting the user a message indicating the error, wherein the message states the error in a first context and in at least a second context.

13. The system of claim 12, wherein the at least two business process components have shared functionalities.

14. The system of claim 12, wherein the message identifies at least one of: a task that could not be performed, at least one of the data fields that resulted in the error, and a process that prevented the performance of the task due to the error.

15. The system of claim 12, comprising a database for storing the error information.

16. The system of claim 15, wherein said processor analyzes the stored information to identify common errors and reviews the common errors to determine if a software problem is a reason for the common errors.

17. The system of claim 12, wherein said processor passes the error information through a calling chain comprising the at least two business process components and identifies a source for the error in the calling chain.

18. The system of claim 12, wherein the error information moves through the at least two business process components.

19. The system of claim 12, comprising a website for application developers to modify the error message.

20. The system of claim 12, wherein the at least two business processes components include at least a first insurance coverage business component and a second insurance coverage business process component.

21. The system of claim 12, comprising an access database for determining an amount of access to error information to be provided to the user.

22. The system of claim 12, wherein the first business process component comprises an insurance database and the second process component comprises an insurance application business component.

23. A method for handling errors, comprising the steps of:
- having a common error handling component together with at least two business process components, including at least a first insurance business process component and a second insurance business process component;
- receiving by the common error handling component, error information from at least one of said business process components when one of said components experiences an error;
- presenting a user with at least one data field for entry of data via a communications network to perform a task, wherein the task involves invoking at least one of the at least two business process components;
- receiving an input from the user in the at least one data field;
- identifying the input as resulting in an error; and
- presenting to the user via the communications network a message indicating the error, wherein the message states the error in a first context and in at least a second context.

24. The method of claim 23, wherein the message identifies at least one of: a task that could not be performed, at least one of the data fields that resulted in the error, and a process that prevented the performance of the task due to the error.

25. The method of claim 23, comprising:
- passing the error information through a calling chain comprising the at least two business process components; and
- identifying a source for the error in the calling chain.

26. The method of claim 23, wherein said user comprises at least one of an insurance customer and an insurance agent.

27. The method of claim 23, wherein the first insurance business process component is an insurance database business process component and the second insurance business process component is an insurance application business process component.

28. The method of claim 23, wherein the first context identifies a task that could not be performed, and the second context indicates at least one of: at least one of the data fields that resulted in the error and a process that prevented the performance of the task due to the error.

29. The method of claim 23, wherein the error information moves through the at least two business process components.

30. A method for handling errors, comprising the steps of:
- presenting a user with at least one data field for entry of data via a communications network to perform a task, wherein the task involves invoking at least one insurance business process component;
- receiving an input from the user in the at least one data field;
- identifying the input as resulting in an error in at least one of said components; and
- presenting to the user via the communications network a message indicating the error, wherein the message states the error in a first context and in at least a second context.

31. The method of claim 30, wherein the first context identifies a task that could not be performed, and the second context indicates at least one of: at least one of the data fields that resulted in the error and a process that prevented the performance of the task due to the error.

32. The method of claim 30, wherein said user comprises at least one of an insurance customer and an insurance agent.

33. The method of claim 30, wherein the at least one insurance business process component is an insurance application business process component.

34. The method of claim 30, wherein the message identifies at least one of: a task that could not be performed, at least one of the data fields that resulted in the error, and a process that prevented the performance of the task due to the error.

* * * * *